United States Patent Office 2,931,063
Patented Apr. 5, 1960

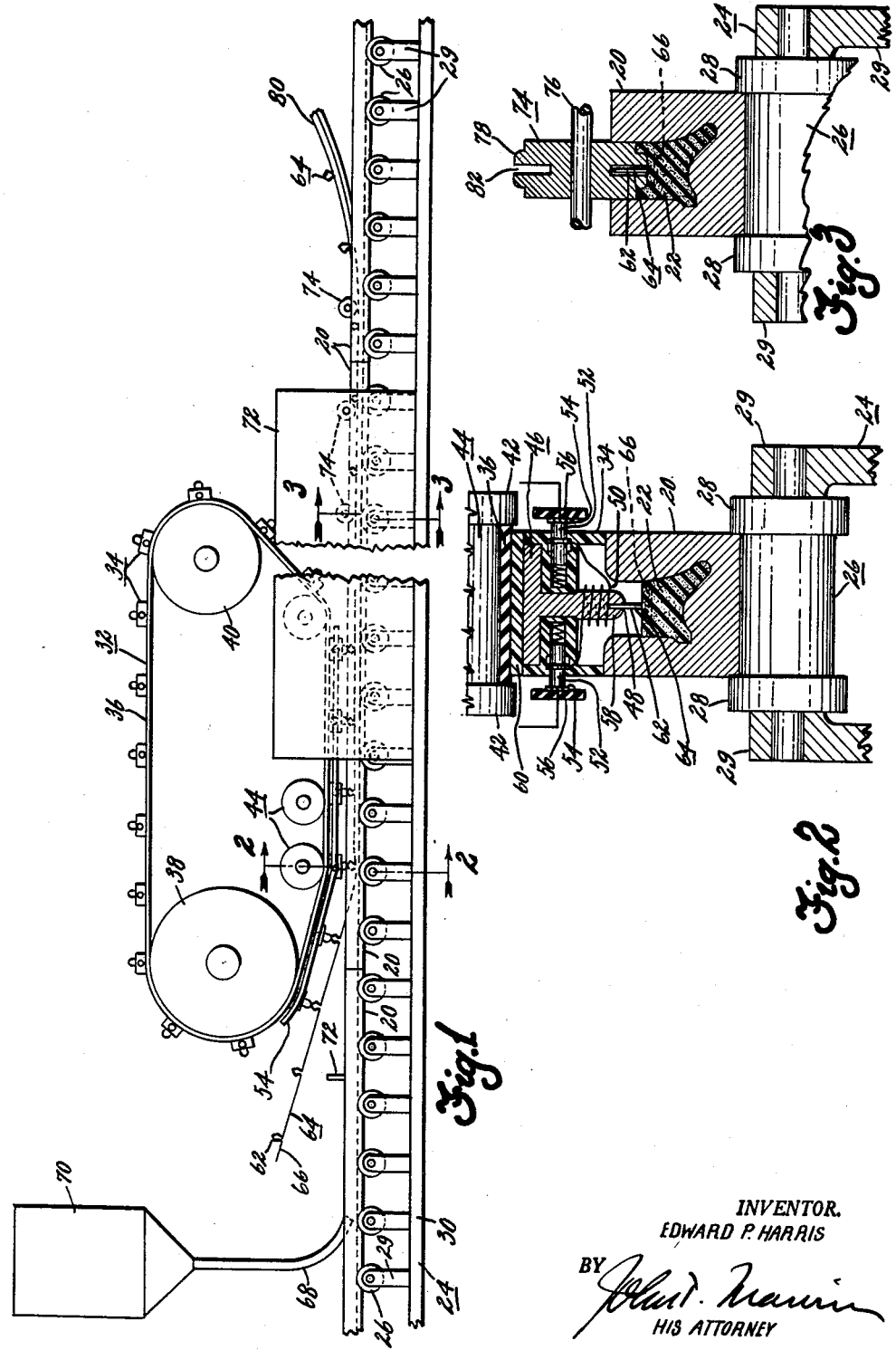

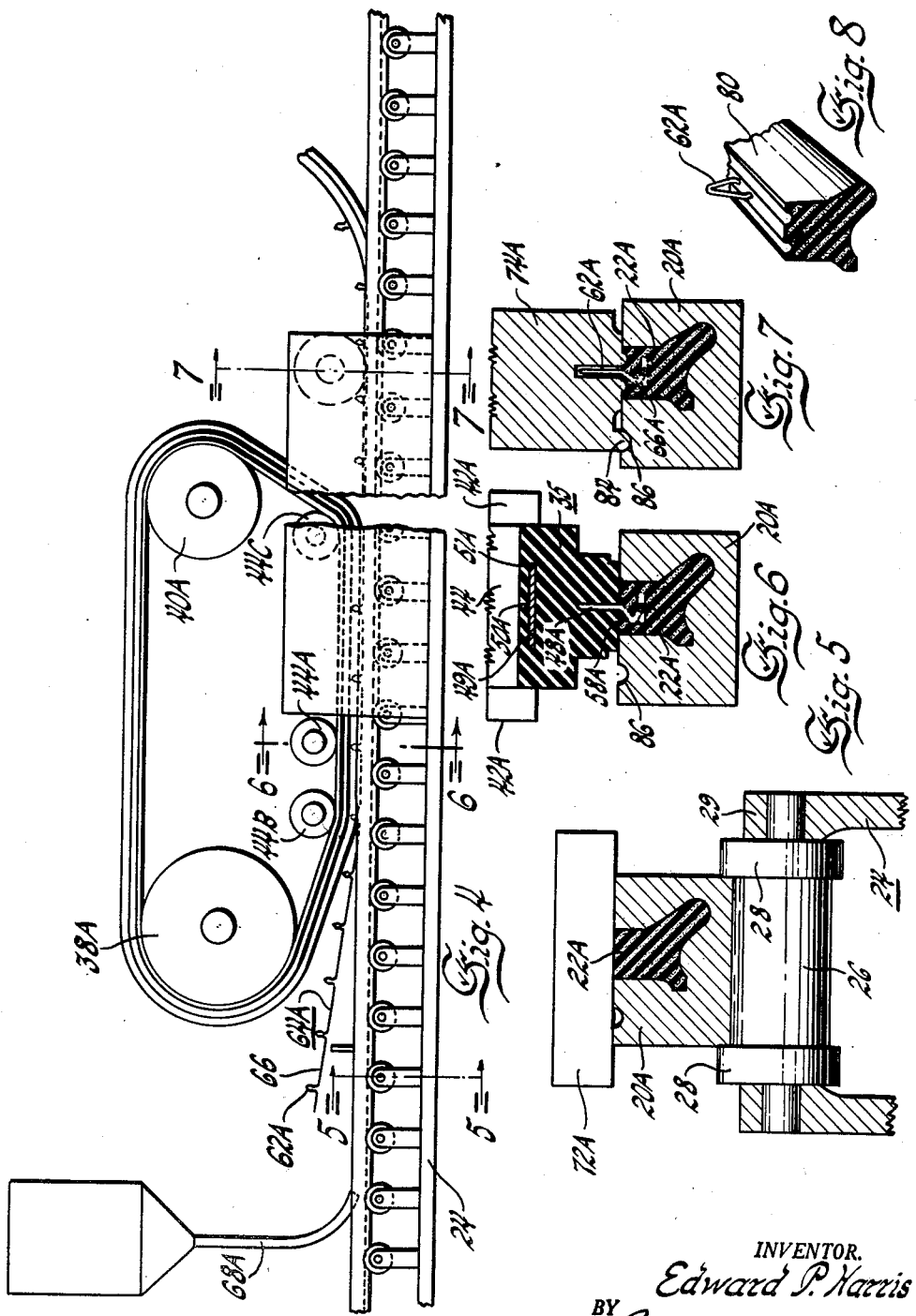

2,931,063

APPARATUS AND METHOD FOR MOLDING FOAM LATEX STRIPS AND THE LIKE

Edward P. Harris, Dayton, Ohio, assignor to General Motors Corporation, Detroit, Mich., a corporation of Delaware Application July 8, 1954, Serial No. 442,039

5 Claims. (Cl. 18—4)

This invention relaes to an apparatus and a method for continuously forming strips of moldable material and more specifically the invention is directed to molding operations on latex foam and other similar materials whereby a continuous length of strip having an attaching means embedded therein is formed in an open mold cavity.

When latex or other similar materials are molded in cavities to continuously form molded strips that have attaching means partially embedded in the molded material, problems arise both in the filling of the mold and the maintaining of the attaching means in poistion in the cavity while the latex sets and assumes the shape of a mold. These problems require close control and have heretofore limited the length of strip that can be economically formed. Therefore one of the objects of the present invention is to form an elastomeric strip with an apparatus and method which comprehends progressively filling an open moving mold cavity with a flowable moldable material to a predetermined depth and maintaining an attaching means for the strip in position within the filled open mold cavity so that the strip which is thus continuously formed may have an attaching means secured therein. Specifically the method and apparatus of this invention comprehends the flowing of a foamy flowable material from a nozzle to uniformly fill a moving cavity to a predetermined depth and providing a means for maintaining an attaching means for the strip in spaced relation relative to the walls of the mold cavity and partially embedded in the material contained within the cavity while the material sets and forms a strip conforming to the shape of the mold cavity and subsequently removing said strip with the embedded portion of the attaching means firmly secured in the material forming the body of the strip from the open mold cavity.

It is another object of the present invention to provide an apparatus and method for progressively filling an open mold cavity to form a continuous length of molded strip that has the reinforcing portions of attaching and reenforcing element for the strip embedded in the elastomeric material which forms the strip. This object is accomplished by providing a moving mold having an open exposed cavity of predetermined shape and also providing a holding means adapted to move at substantially the same rate of travel as the mold cavity for holding the attaching portions of the reinforcing and attaching element and maintaining the reinforcing portion thereof in spaced relation to the sides of the mold cavity after the cavity has been filled with the flowable fluid foamy compound during the setting or gelling of the material within the cavity for forming a strip that conforms to the shape of the cavity the reinforcing means therefor embedded therein.

It is a further object of the present invention to hold the attaching portions of attaching clips for an elastomeric strip in spaced relation to the walls of a continuously moving mold cavity while other portions of the clips are held embedded in a fluid foamy moldable material contained within cavity until the material sets or gells and assumes the shape of the mold cavity to form an elastomeric strip that has a portion of the attaching clips embedded therein.

It is another object of the present invention to hold the clip-like portions of a reinforcing element for an elastomeric strip so that the reinforcing portions of the element which are held in spaced relation to the walls of a continuously moving exposed mold cavity are embedded in a fluid foamy material contained within the cavity until the material sets and assumes the shape of the cavity to form a reinforced elastomeric strip with attaching clip-like portions projecting above the surface of the strip.

It is another object of the present invention to shape the material adjacent the surface of an elastomeric strip that has an attaching means for the strip projecting above the surface to be operated upon while the strip is in an open mold cavity. This object is materialized by holding a portion of the attaching means for the strip in spaced relation to the walls of the mold cavity while the fluid foamy material contained within the cavity sets and assumes the shape of the mold cavity and embeds a portion of the attaching means therein so that a forming roller will impart a predetermined configuration to the set material in said cavity after the holding means are released and prior to the curing of said material.

Further objects and advantages of the present invention will be apparent from the following description, reference being had to the accompanying drawings, wherein a preferred embodiment of the present invention is clearly shown.

In the drawings:

Figure 1 diagrammatically shows one embodiment according to the present invention.

Figure 2 is a view partly in section along line 2—2 of Figure 1.

Figure 3 is a view partly in section taken along line 3—3 in Figure 1.

Figure 4 diagrammatically shows another embodiment of the present invention.

Figure 5 is a view partly in section along line 5—5 in Figure 4.

Figure 6 is a view partly in section along line 6—6 in Figure 4.

Figure 7 is a sectional view along line 7—7 in Figure 4.

Figure 8 is a perspective view partly in section of a strip as formed according to the present invention.

In the drawings, and in Figure 1 particularly wherein the various prats of one embodiment of the apparatus of the present invention is diagrammatically shown, the numeral 20 designates a plurality of mold parts which are axially aligned in end to end relation and forced into tight engagement with each other to form a continuously extending mold cavity 22 as is disclosed in application Ser. No. 404,554, filed January 18, 1954, and assigned to the assignee of the present invention. The cavity 22 has a predetermined cross sectional shape and in the specific form illustrated may have a cross-sectional shape designed to mold a rubber automobile door sealing strip 80 of the type disclosed in Figure 8 or in Patent 2,579,072, filed March 15, 1951, by Edward P. Harris and assigned to the assignee of the present invention.

The mold segments 20 are supported in aligned position on the rolls 26 of a conveyor 24. These rolls 26, rotatably journalled in supports 29 carried by a base 30, have shoulder portions 28 which align and guide the mold segments 29 of the mold when individual mold segments are placed in end to end relation on the conveyor 24 and are moved therealong by a suitable means, not shown.

The holding means for the clip 62A portions of strip 80 in the embodiment shown in Figure 1 may be of the magnetic type such as suitable permanent magnets or preferably individual electromagnets 34 that are secured in spaced relation to one another on a flexible belt-like conveyor 36. It is apparent either types of magnets are suitable for use with the present invention as the weight required to be supported is small, i.e. the weight of only a small length of wire, and hence either can be used. The electromagnetic type is herein described as it is readily apparent that the substitution of permanent magnets for the electromagnets may be made without difficulty. In either of these embodiments the magnets 34 are sequentially moved by the belt-like conveyor 36 which is driven over rollers 38 and 40 by a suitable driving means, not shown, so that the rate of travel of belt 36 is equal to the movement of the mold segments 20. The electromagnetic elements 34 are sequentially moved by the belt 36 into contiguous relation with the moving mold 22. The belt 36 is maintained in alignment with mold 22 by the end flanges 42 of rollers 44 which are located to maintain the belt 36 in horizontal and vertical alignment with the mold 20 during the movement of the holding means 32 and mold 20.

The magnetic elements 34 are preferably formed with a magnet core 46 that has a slot 48 on an end 58, the purpose of which will be herein described, and a coil winding 50, wound about core 46, has its ends electrically connected with brushes 52 which are adapted to slidingly contact conductors 54 which extend over a predetermined distance along the length of travel of the conveyor 36 as is shown in Figure 1. These conductors 54 may be supported by suitably insulated supports 56, shown particularly in Figure 2. The magnetic core 46 is preferably made of aluminum or other suitable material so that its magnetic action will be present only during the periods when the coil 50 is energized. The end portion 58 of core 46 is maintained in spaced relation relative to mold cavity 22 by a frame 60, which is preferably made of insulating material and is formed so that it will engage the top surface of mold part 20 when the parts are in contiguous relation with each other.

As clearly seen in Figure 1 the attaching means or clip portions 62 of a reinforcing wire element 64 are progressively fed from a suitable supply, not shown, and directed so that the individual clip portions 62 will be received within slots 48 during the period when the electromagnetic holding coil 50 is energized from a suitable source of current, not shown, so that the reinforcing element or wire 64 is maintained in a spaced relation relative to the walls of the open mold cavity 22 as the mold 20 and holding means 32 are moved from a separated into contiguous relation and during the length of travel in which said contiguous relation is maintained.

Prior to the positioning of the reinforcing wire element 64 in mold cavity 22, the mold is progressively filled with a fluid foamy latex material. This is accomplished by progressively filling the moving mold cavity from a filling nozzle portion of conduit 68 which leads from a suitable supply 70 so that the mold cavity 22 is progressively filled as it moves. A doctor blade 72 located anterior to the delivery nozzle of conduit 68 and posterior to the point of entry of the reinforcing element 64 will progressively scrape off any excess of foam latex that may be present at the open mold cavity 22 and assure a proper level fill and thus permit a portion of the reinforcing wire element 64 to be embedded in fluid filling as is clearly seen in Figure 2.

If the final shape of the strip desired approximates that shown in Figure 2, then the magnetic holding means 32 may be used to maintain the portion 62 of the reinforcing and attaching element 64 until the foamy material contained within the cavity has set or gelled so that the strip 80 so formed will have the shape of the mold cavity 22 and have portions of the reinforcing element 64 embedded therein, or if desired, the magnetic holding means 32 may be used to hold the attaching elements 62 until the material in mold cavity 22 is completely cured at which point the energization of the magnetic coil 50 is terminated and the molding elements 34 and mold parts 20 are separated by the roller 40 so that the cured strip 80 may be removed from the mold. To hasten the setting and cure, if desired, a heating chamber 72 may be provided.

If however, the shape of the strip as shown in Figure 3 is desired, the release of the magnetic holding elements 34 is accomplished after the material contained within cavity 22 has set or gelled and prior to the point at which it is cured. This is accomplished as shown in Figure 1 by moving the magnetic holding elements 34 out of contiguous relation by roller 40 anterior to the point at which setting or gelling occurs and posterior to the point at which the material within the cavity is cured so that while the set material within the cavity has sufficient strength to maintain the embedded portion 66 of attaching wire element 64 in position in the mold cavity, whereby a suitably shaped means or roller 74, as shown in Figure 3, may be employed to deform the set material into any desired shape. Roller 74 is suitably rotatably journalled on a shaft 76 that is vertically spaced relative to mold cavity 22 so that the configuration of its outer surface 78 will be imparted to the set but not cured material contained within mold cavity 22. The roller 74 is also provided with a slot or groove 82 on its outer surface 78. This slot 82 is adapted to permit the passage of the portions 62 of element 64 when the surface 78 contacts and shapes the material in mold cavity 22. The final cure of the material contained within cavity 22 is achieved anterior to the point of application of roller 74. This cure may be prior to the exit of strip 80 from the heating chamber 72 if desired.

In the embodiment shown in Figures 4 to 8, the mold cavity 22A extends to the upper surface of mold 20A which is supported on the conveyor 24 as heretofore described, so that the substantially straight edge of a doctor blade 72A may merely engage the upper surface of mold 20 as it scrapes the excess filling deposited in cavity 22A by a filling nozzle 68A.

In this embodiment, the reinforcing and attaching wire 64A is maintained in proper position in mold cavity 22A by an elastomeric belt-like holding means 35 which is driven over rollers 38A and 40A by a suitable driving means, not shown, so that the rate of travel of the holding means 35 is equal to the movement of mold segments 20A. The holding means 35 is moved into a contiguous relation with the moving mold segments 20A and is maintained in alignment therewith by the end flanges 42A of rollers 44 which are located to maintain the holding means 35 in horizontal and vretical alignment with the mold 22A during the movement of the holding means 35 and the mold 20A.

The holding means 35, which may be of suitable elastomeric material such as natural or synthetic rubbers or mixtures thereof, is formed with a longitudinally extending continuous split 48 of predetermined depth as defined and located between a pair of lips 58A may be sized if desired to engage the top surface portions of mold 20A and thereby aid in the vertically positioning the holding means 35 relative to the mold cavity 22A. The contiguous edges of the lips 58 may be found to be in pressure contact with each other to normally close the slot or slit 48A. This closing of the slot 48A may be aided by suitably embedding a metallic leaf member 49A in a slot 51A in the body of the holding means 35. The inclusion of the metallic leaf member 49A in the body of the holding means 35 may be accomplished by passing the leaf member 49A through a split 50A into the slot 51A. The leaf member 49A may also be included in the body of the holding means during its formation by either a molding or extruding process as is well known to those skilled in the art and when so included may be bonded to the elastomeric body of the holding means if desired so as to reduce the possibility of the elongation of the holding means when it is placed in service. Further the leaf member 49A if it is inserted through the split 50A into split 51 may be cemented or otherwise secured therein where it will serve to act as a hinge member for causing lips 58A to tightly engage each other for holding the attaching portions 62A of wire 64 in proper position in the mold cavity 22A.

To facilitate the entry of portions 62A into split 48A, the periphery of the first of a series of rollers 44A may be convexly curved between the flanges 42A. Thus as a holding means 35 passes over the curved surface of the first roller 44A, the body of the holding means 35 is flexed to spread the lips 58A and expose or open slot 48A, which has a predetermined depth so that portions 62A may be readily directed from a suitable supply, not shown, between the spread lips 58A into a predetermined position so that the reinforcing portion 66A of the member 64A will be correctly positioned relative to the walls of the mold cavity 22A when the flexing force of the roller 44A of the moving means 35 is removed.

If the shape of a strip as shown in Figure 8 is desired, the release of the holding means 35 is accomplished after the material contained within cavity 22A has suitably gelled and prior to the point at which it is cured. This is accomplished as shown in Figure 4 by moving the holding means 35 out of contiguous relation and holding engagement with portions 62A by roller 44C which may have its periphery curved as roller 44B and is located anterior to the point at which setting or gelling appears and posterior to the point at which the material within the cavity 22A is cured so that while the set material within the cavity has sufficient strength to maintain an embedded portion 66A of wire element 64A in position in the mold cavity, a suitably shaped means or roller 74A, partly shown in Figure 7, may be employed to deform the top surface of the set material into any desired shape. Roller 74A is suitably journaled on a shaft, not shown, and is vertically spaced relative to the mold cavity 22A so that the configuration of its outer surface 78A will be imparted to the set but not cured material contained within the mold cavity 22A. Further it is apparent that if the proper configuration is to be imparted by the roller 74A to the top surface of the material as contained within the mold cavity 22A, it will be necessary that the roller constantly be maintained in transverse and vertical alignment with a mold 20A. To accomplish this objective the roller 74A not only rides on the top surface of the mold 20A but it also has a bead 84 on its periphery. This bead 84 rides in a groove 86 formed on the top surface of mold part 20A to extend longitudinally throughout the length of mold 20A to maintain the roller 74A in transverse alignment with mold 20A.

In connection with the process as shown in the modification, it is to be noted that all other parts and reference numerals therefore are similar to that of precedingly described in the embodiment shown in Figures 1 to 3, with such modifications as generally described to permit proper operations of the various parts of the apparatus wherein the holding means may contact the top surface of the mold or be separated therefrom providing the holding means is properly vertically spaced from the mold cavity so that portions only of the reinforcing wire are held embedded in proper position within the filled cavity.

From the above it is apparent the strip 80, when formed in either of the embodiments, will have its entire external surface, substantially formed to any predetermined configuration as determined by the shape of mold cavity and the outer peripheral surface of roller 74 or roller 74A. Further while in the above described embodiment only a single strip is shown as formed in a single mold cavity, a plurality of strips may be simultaneously formed if a plurality of single mold parts are laterally located in side-by-side relation with each other and with a necessary duplication of all the other necessary parts of the apparatus.

In order to have a sufficient supply of foam latex material available in supply chamber 70, a continuous foamer is preferably used to provide a continuous supply of latex foam having a predetermined gelling characteristic at the filling nozzle or nozzles. The gelling of the liquid latex as supplied to the mold must be carefully controlled as is accomplished by the use of proper gelling agents, etc. as is well known to those skilled in the art. To aid in the control of the gellation of the liquid latex, the temperature of the metallic mold parts at the point of filling is preferably maintained at a constant temperature. This is accomplished by providing heating and/or cooling coils, not shown, prior to the point of injection of the liquid foam so that the metallic mold part will be at a known predetermined temperature before the latex is included therein. This will aid in the control of the gellation or setting of the foam latex and will also result in a more uniform cure. Further it may be necessary to treat the surfaces of the mold parts to reduce the adherence of the molded part thereto during the operation of the process. This may be accomplished by applying a suitable well known mold lubricant or coating as carbo wax to prevent the adherence of the molded material by any suitable method as known to those skilled in the art. If desired, the metallic mold portions may be treated by a suitable coating or by anodizing the metallic parts if the mold parts are of aluminum or aluminum alloy. Further if any other cleaning and temperature control of the parts is required, a suitable apparatus not shown may be provided so that at all times a clean mold cavity at a constant temperature will be presented at the point of injection of the liquid latex.

When the apparatus as shown is utilized, the number of mold segments required must be sufficient to constantly present a length of open mold cavity to the wire holding means. These segments may be conveyed by any suitable means such as by hand or by a suitable conveyor to the point of entrance of the apparatus from the exit and after the removal of the strip 80 from the mold cavity.

The apparatus and method described above is particularly suitable for making sponge rubber strips of suitable foam latex compound. Such foam latex compound when in an ungelled condition is flowable to any desired degree and can easily be injected through a filling nozzle 60 or 68A at a constant rate of flow to progressively fill the mold cavity 22 or 22A. It is further apparent that the reinforcing element 64 or 64A may not be continuous and that the attaching clip portions may consist of individual attaching clips which are suitably fed by a suitable automatic feeding device to a position where they may be held by the holding means so that a portion of the individual clips will be embedded within the material which is subsequently set within the mold cavity 22 or 22A in the manner heretofore described.

The specific compound material used in the molding operation forms no part of this invention and may be of any of the well known moldable materials and the apparatus used may be adjusted for any desired rate of travel. The length of the heating chamber 72, if used, and the temperature thereof may be controlled to yield any desirable result as well known in the art.

It is clearly apparent that if desired, the metallic mold parts 20 or 20A may be replaced by a continuously extending elastomeric mold part similar to that disclosed in application Ser. No. 404,576, as filed January 18, 1954, by the inventor William H. Schmeling and assigned to the assignee of the present invention. In the event that the elastomeric mold parts are utilized the compound used to form this part and/or holding means 35 may be of any suitable cured elastomeric material such as butadiene styrene copolymers, acrylonitrile copolymers, natural rubber, etc., mixtures of the above or any other suitable material providing the material selected will have the proper degree of flexibility for the application involved to be able to withstand the temperature of the setting and/or curing without deleterious reactions. It is to be noted however, that the use of metal or metal alloy mold parts improves the heat transmission to the material within the mold cavity and thereby reduces the overall cost of operation.

It is to be understood that the heating end or cooling apparatus forms no part of this invention and merely facilitates the explanation thereof as the control of temperature is necessary in the setting and curing of rubberlike compounds.

In connection with the method and apparatus set forth therein it is to be noted that other methods and apparatus may be used to form strips similar to the type herein disclosed. These are disclosed in applications Ser. Nos. 404,554, 404,648, now abandoned, 404,649, now Pat No. 2,817,875, 404,566, now abandoned, 404,576, now Pat. No. 2,835,924, as filed January 18, 1954, and assigned to the assignee of the present invention.

It is further to be noted that the reinforcing and attaching wire 64 as shown in the present invention may be formed without the crinkled or zig-zag portion and may present merely a plurality of spaced clips that are interconnected by a straight length of wire that is embedded in the material of the strip when strip is formed as heretofore set forth.

While the embodiment of the present invention as herein disclosed, constitutes a preferred form, it is to be understood that other forms might be adopted.

What is claimed is as follows:

1. In a method for forming an elastomeric strip having an attaching means embedded therein, the steps comprising; continuously moving a mold having a longitudinally extending open exposed cavity of predetermined cross-sectional shape and a holding means at substantially equal rates of travel from a separated into a contiguous relation with each other over a predetermined length of travel of said mold, progressively filling said mold cavity to a predetermined depth with a fluid foamy compound and progressively holding portions of said attaching means for said strip with said holding means while embedding other portions thereof in said fluid filling and in spaced relation from the walls of said cavity while said mold and holding means move concomitantly, over a predetermined length of travel sufficient to permit the fluid foamy compounds to set and to form a defined strip of said compound having the shape of said cavity, releasing the attaching portions of said attaching means from said holding means before the material within said cavity is cured to its final form, progressively imparting a predetermined shape to the exposed surface of the material within said open exposed cavity and finally progressively removing said strip with portions of the attaching means embedded therein from said cavity while the mold continues to move.

2. In a method for molding an elastomeric strip from a fluid foamy compound having an element partially embedded therein for providing a reinforcing and attaching means for said strip, the steps comprising; moving a mold of indeterminate length having an open exposed mold cavity of a predetermined cross sectional shape, moving a plurality of electromagnetic holding means at substantially the same rate of travel as said mold from a separated into a contiguous relation which said mold over a predetermined length of travel of said mold, progressively filling said mold cavity to a predetermined depth with a fluid foamy compound, progressively holding the attaching portion of a reinforcing and attaching element for said strip in said electromagnetic holding means for maintaining the reinforcing portion thereof embedded in the fluid foamy filling and in spaced relation with the walls of said cavity while said electromagnetic means and mold move in said contiguous relation and the material within said cavity gells and forms a defined strip of said compound having the shape of said cavity and having the reinforcing portions of said element embedded therein, releasing the attaching portions of said element from said magnetic holding means after the material has gelled and prior to the curing of said material; progressively imparting a predetermined shape to the exposed surface of the material within said open exposed cavity and finally progressively removing said reinforced strip from said cavity.

3. An apparatus for continuously forming an elastomeric strip having portions of an attaching means embedded therein, comprising in combination; a moving mold of continuous length having a longitudinally extending open exposed cavity of predetermined shape on one surface thereof, a holding means adapted to move at substantially the same rate of travel from a separated into a contiguous spaced relation to the walls forming said cavity; a means to progressively fill said cavity to a predetermined depth with a fluid foamy compound, a means for positioning an attaching means for said strip in said holding means whereby said attaching means is held in spaced relation to the walls of said cavity and is partially embedded in the material contained within said cavity after the cavity is filled with a fluid foamy compound while said material sets and assumes the shape of said cavity and maintains the embedded portion of the attaching means in position in said material, means for releasing and moving said holding means from said contiguous relation whereby a surface of the material within said cavity is exposed, a means for imparting a predetermined configuration to the exposed surface of the material within said cavity subsequent to the removal of said holding means and prior to the cure of the material within said cavity and means for removing said formed strip from said cavity.

4. In a method for forming an elastomeric strip having an attaching means embedded therein, the steps comprising; moving a plurality of mold parts having an open exposed cavity of predetermined cross-sectional shape to form a continuously extending open moving mold cavity, moving an elastomeric holding means having a continuously extending longitudinally extending split therein at substantially the same rate of travel from a separated into a contiguous relation with said mold parts over a preedtermined length of travel of said mold cavity, progressively filling said mold cavity to a predetermined depth with a fluid foamy compound, progressively inserting holding portions of said attaching means for said strip in the split of said holding means so that other portions of the attaching means may be embedded in the fluid foamy compound when the molding means is in contiguous relation with said mold cavity, maintaining said embedded portions in spaced relation from the walls of said cavity while said mold and holding means move concomitantly over a distance sufficient to permit said fluid foamy compounds to set and to form a defined strip of said compound having the shape of said cavity, releasing the attaching portions of said attaching means from the split of said holding means before the material within said cavity is cured to its final form, moving said holding means out of contiguous relation with said mold for exposing a surface of the set material within said cavity progressively imparting a predetermined shape to the exposed surface of the material within said open exposed cavity and finally progressively removing said formed strip with portions of the attaching means embedded therein from said cavity while the mold continues to move.

5. In a method for forming an elastomeric strip having an attaching means embedded therein, the steps comprising; continuously moving a plurality of mold parts each having an open exposed cavity of predetermined cross sectional shape to form a continuously extending open mold cavity, moving a holding means at substantially the same rate of travel as said mold from a separated into a contiguous spaced relation with said mold cavity, progressively filling said open mold cavity to a predetermined depth with a fluid foamy compound, progressively holding portions of said attaching means for said strip with said holding means while embedding other portions of the attaching means in the fluid foamy compound in spaced relation from the walls of said cavity while said mold and holding means both move concomitantly over a predetermined length of travel sufficient to permit said fluid foamy compound to set and form a strip having the shape of said cavity, releasing the attaching portions of said attaching means from said holding means, imparting a predetermined contour to the exposed portion of the material in said cavity after the material is set and prior to the cure thereof and finally progressively removing said strip with portions of the attaching means embedded therein from said open cavity while the mold and holding means each continues to move.

References Cited in the file of this patent

UNITED STATES PATENTS

| | | |
|---|---|---|
| 842,356 | Stone | Jan. 29, 1907 |
| 2,315,366 | Daley | Mar. 30, 1943 |
| 2,465,276 | Ryder | Mar. 22, 1949 |
| 2,668,987 | Harris | Feb. 16, 1954 |